Feb. 20, 1934.  E. A. DICKEY  1,947,903
BRAKE MECHANISM FOR MOTOR VEHICLES
Filed April 19, 1932
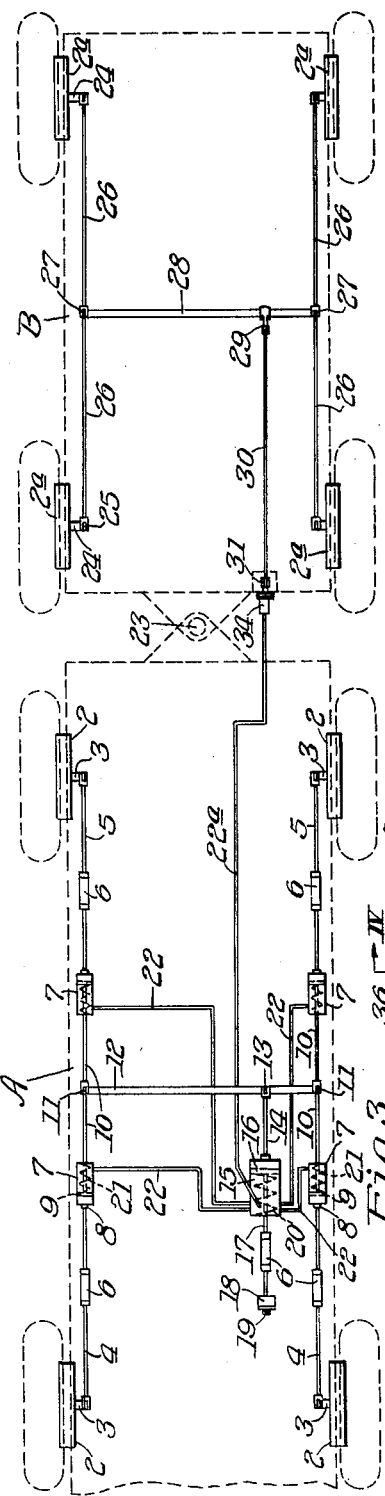
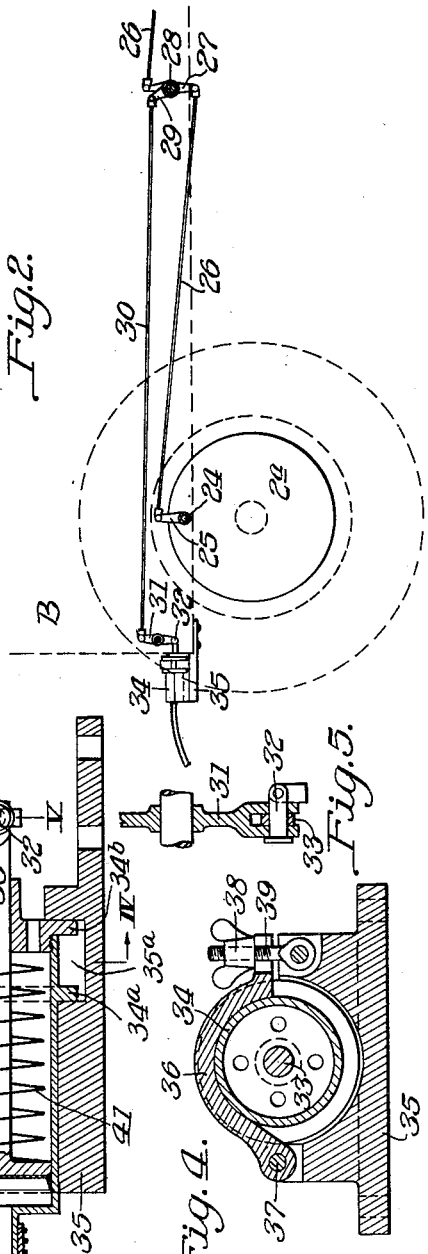
INVENTOR.
Edward A. Dickey
BY C. M. Clarke
ATTORNEY.

Patented Feb. 20, 1934

1,947,903

UNITED STATES PATENT OFFICE 1,947,903

BRAKE MECHANISM FOR MOTOR VEHICLES

Edward A. Dickey, Aliquippa, Pa.

Application April 19, 1932. Serial No. 606,141

3 Claims. (Cl. 188—3)

My invention consists of an improvement in equalizing brake systems, utilizing a combination of fluid actuated and mechanically actuated means for applying equal pressure to the several individual braking units, as the usual expanding friction shoes of the wheel drums. The invention also discloses the combination with such a system of a supplemental application of braking power to the wheels of a trailer coupled to a truck or the like, and an improved construction of removable cylinder for the trailer braking equipment, as hereinafter described.

In the drawing illustrating certain preferred forms of the invention:

Fig. 1 is a diagrammatic plan view of the equipment as applied to a four wheel truck and a trailer coupled thereto;

Fig. 2 is a detail view in side elevation, showing application of the braking system to one wheel of the trailer;

Fig. 3 is a sectional detail view of the trailer brake actuating cylinder and its connected parts for application to the wheel brakes of the trailer;

Fig. 4 is a cross section on the line IV—IV of Fig. 3;

Fig. 5 is a section on the line V—V of Fig. 3.

The construction of this application is a further development of the invention of my companion application filed herewith Serial No. 606,140.

Referring to the drawing, 2 are the usual brake drums of a four-wheel truck A, each having a lever actuated rocking pin 3 operable to effect frictional braking resistance by tension of the pair of front connecting rods 4 and rear connecting rods 5.

Each of said rods is provided with a turnbuckle 6 for adjustment thereof as may be required.

A series of four floating or movable service cylinders 7 are located in alinement with the connecting rods 4 and are connected, as at 8, with each rod, whereby each cylinder becomes the pulling connecting link element of each rod. Within each cylinder is a piston 9 secured to the end of a secondary connecting rod 10, the other end of which is secured to the end of a double acting lever 11, one at each side of the equipment. Said levers are mounted on the ends of a transverse rock shaft 12 mounted in bearings on the chassis frame and having an actuating lever 13.

Said lever is provided with a connecting rod 14 secured to the end of a master cylinder 15 having a piston 16 which in turn is provided with a rod 17 extending through the end of the cylinder and connected to the pedal actuated lever 18 having a pivotal bearing 19. Between the piston 16 and the end of the cylinder is a retracting spring 20 for resumption of normal position after each operation, and a similar spring 21 is inserted between each piston 9 and the opposite end of the several service cylinders 7.

A flexible tubing or piping system consisting of individual conductors 22 directly connects each service cylinder 7 with the master cylinder 15, maintaining a continuous column of liquid, as oil, from the master cylinder to and throughout the interior of the several service cylinders and their communicating connections. Such liquid being incompressible, it constitutes a mobile abutment or link between the pistons 9 and the end of each service cylinder 7 when held therein by the piston 16 of master cylinder 15. The forward movement of treadle 18, depending upon its extent of movement, will displace the liquid in the cylinder 15 to a corresponding degree, effecting simultaneous charging of liquid into each service cylinder 7.

Under such conditions, any slack throughout the full extent of each compound connecting rod and cylinder assemblage 4—7—10, between levers 11 and 3, is taken up, and the continuous connection between the levers is then practically rigid, by reason of the presence under pressure of the liquid in each service cylinder. Continued pressure of the pedal, acting through the then immobile body of liquid in master cylinder 15, moves said cylinder and connecting rod 14 forwardly, rotating rock shaft 12 and levers 11, and transmitting the brake applying or setting movement to the several connecting rod 4 and 5 assemblies, for simultaneous setting of the brakes for each of the four wheels of the truck. Upon release of pressure of the treadle, the tension due to liquid pressure will be relieved, assisted by springs 20 and 21, with relaxation and resumption of normal position of the parts, ready for the next application.

In the application of such developed pressure, power in the piping system to the trailer B, of any usual construction, coupled to the truck A at 23, the several wheels of the trailer are assumed to be provided with customary braking mechanism and drums 2a. Each of said drums is provided with a shoe expanding stem or cam shaft 24 and lever 25 actuated by rod 26 from the double lever 27 of cross shaft 28. Said shaft has an actuating lever 29 connected by rod 30 and lever 31 by a quickly removable bolt 32, to the end of piston rod 33 of the trailer cylinder 34. Cylinder 34 is removably mounted on a bracket 35 bolted or otherwise secured to the front end of the chassis frame of trailer B.

For such purpose the bracket is provided with a suitably shouldered receiving and holding recess 35a engaging flanges 34a and 34b of the cylinder. A quickly opening and closing clamp 36 hinged at 37 and tightened by means of a clamping nut 38 and bolt 39, engaging a transverse slot for easy manipulation and tightening, provides means for mounting the cylinder on the trailer bracket. As thus mounted, cylinder 34 may be readily engaged and disengaged with and from the trailer as desired, such cylinder ordinarily forming a connected portion with the piping system 22 of the truck. As shown, a separate hose or pipe connection 22a is fixedly connected with the front end of cylinder 34 and with master cylinder 15 for transmission of pressure therefrom to cylinder 34, and against the face of a piston 40 at the front end of rod or stem 33.

A retracting spring 41 is inserted between the rear face of the piston and the opposite end of the cylinder for replacement to normal position upon termination of pressure. In action, upon exercise of pressure through movement of piston 16 of master cylinder 15, by treadle action, the pressure of the entire system will be thus transmitted to piston 40, depressing it backwardly, actuating lever 31 and imposing tension movement on rod 30, whereby to effect brake application in each of the several braking units of the trailer.

The operation of such trailer mechanism and equipment is purely mechanical rearwardly of the truck-connected cylinder 34, the adjustment of the several brake mechanisms being by the usual means whereby to effect even application of braking resistance to each of the four wheels. By maintaining cylinder 34 as a fixture with the truck equipment it is always present therewith for immediate connection and use with the trailer by the readily applied and disconnected mechanism above described.

What I claim is:

1. In combination with the trailer of a motor truck provided with means for actuating brake equipment of the trailer; a front supporting bracket secured to and extending beyond the trailer having a transverse shouldered recess and a movable clamp, a cylinder removably mounted on the bracket having a liquid supply conduit and flanges engaging the shouldered recess, and a spring-retracted piston extending through the end of the cylinder and removably connected with the trailer brake actuating mechanism.

2. A motor truck trailer having supporting wheels each provided with braking mechanism and actuating means therefor provided with a terminal lever, a bracket on the trailer having a transversely shouldered recess, a fluid actuated piston and cylinder separably mounted on the bracket having spaced apart abutments engaging the shouldered recess, a clamp on the bracket engaging said abutments, a piston rod extending through one end of the cylinder removably connected with said lever, and a pressure conduit connected to the other end of the cylinder.

3. Means for transmitting fluid pressure from a prime mover on a motor truck to the brake actuating means of a trailer coupled to the motor and having an operating lever, consisting of a bracket on the front end of the trailer, an actuating cylinder and piston removably mounted on the bracket provided at its front end with a fluid pressure connection, a spring-actuated piston in the cylinder having a piston rod extending through the rear end of the cylinder, a bolt removably connecting the piston rod with the trailer lever, and a laterally arranged clamp hinged to the bracket and fixedly holding the cylinder thereon.

EDWARD A. DICKEY.